Sept. 4, 1945.　　　H. J. BALMER　　　2,384,150
MEASURING DEVICE
Filed Jan. 31, 1944
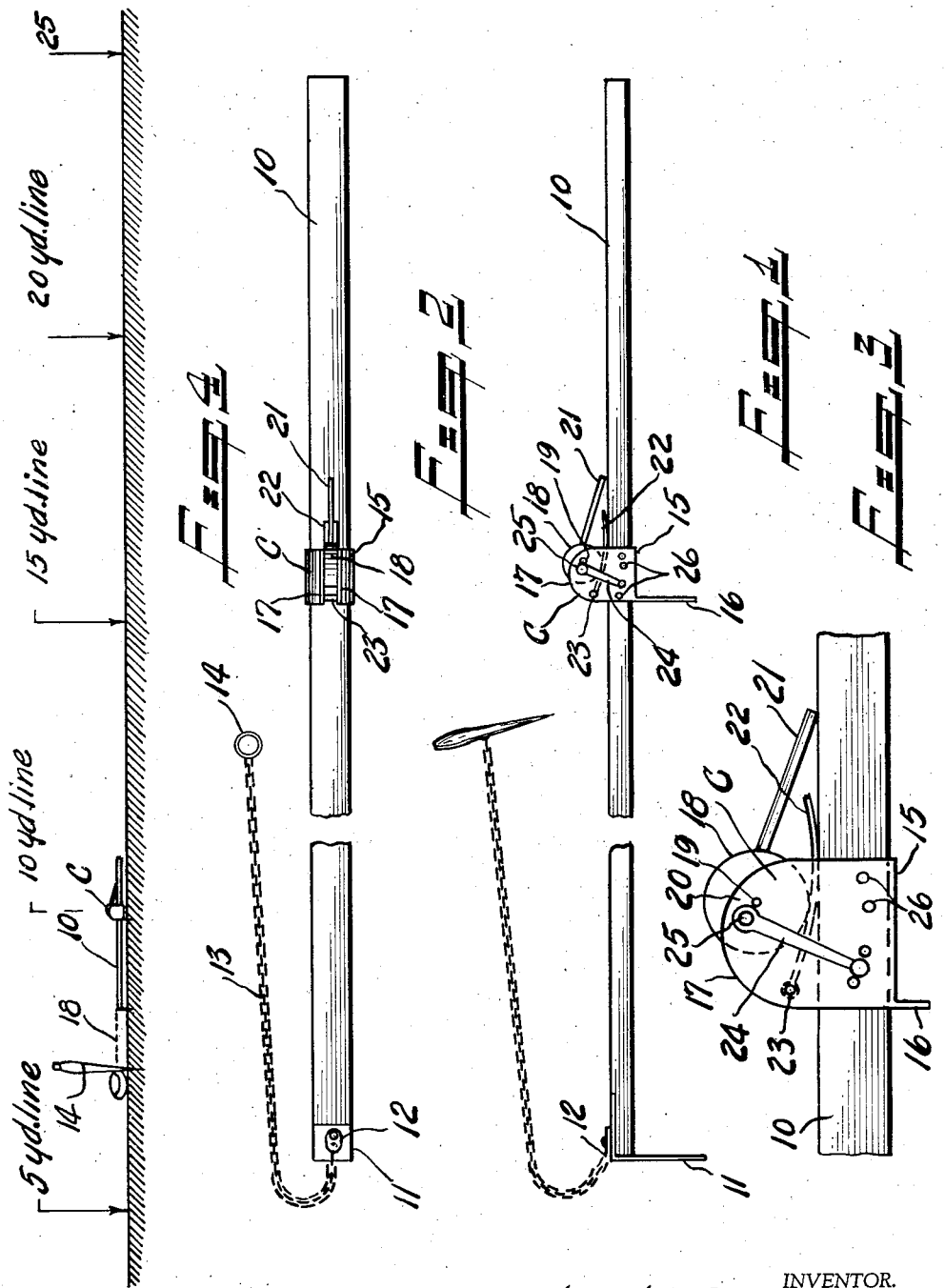
INVENTOR.
Harold J. Balmer
BY Frank C. Learman
Attorney Patented Sept. 4, 1945

2,384,150

UNITED STATES PATENT OFFICE 2,384,150

MEASURING DEVICE

Harold J. Balmer, Portland, Mich., assignor of one-half to Theo E. Ingersoll, Muskegon, Mich.

Application January 31, 1944, Serial No. 520,505

4 Claims. (Cl. 33—125)

This invention relates to a measuring device for use in connection with the game of football for accurately measuring and checking to determine if first down has been made as soon as the ball is "dead."

One of the prime objects of the invention is to design a measuring device composed of few parts which is very easy to handle and operate, and which eliminates the possibility of error in checking for first down.

Another object is to provide a simple, practical, and readily manipulatable means which eliminates the old-fashioned conventional chains used for measuring, speeds up play after punts, which is easy and convenient to handle, and which can be readily manufactured and assembled.

With the above and other objects in view, the present invention consists in the combination and arrangement of parts hereinafter more fully described, illustrated in the accompanying drawing, and more particularly pointed out in the appended claims, it being understood that changes may be made in the form, size, proportions and minor details of construction, without departing from the spirit, or sacrificing any of the advantages of the invention.

In the drawing:

Fig. 1 is a side elevational view of my improved measuring device;

Fig. 2 is a plan view;

Fig. 3 is an enlarged fragmentary view showing the clamping means; and

Fig. 4 is a side elevation showing the device in use on a football field.

The rules for playing football specify that the team having possession of the ball must advance it at least ten yards in four downs or forfeit possession of the ball to their opponents; and when the opposing line is strong and the team decides that it cannot make the necessary yardage, it is general practice, on the fourth down, to kick or punt the ball as far as possible in the direction of the opponents' goal line. This gives the opponents possession of the ball, but usually gains the yardage represented by the distance of the punt, less any run back.

The conventional manner of measuring is to provide a ten-yard chain provided with a metal stake at each end, the one stake being placed in the ground at the point where the ball comes to rest or is "dead." The chain is then stretched taut in the direction the ball is to be advanced, and the opposite stake is then pressed into the ground to mark the ten-yard distance.

The head linesman also carries a suitable stake and registers each advance (on each down) by means of this stake; and if the ball is advanced a distance close to the ten yards, the officials must check to accurately determine if a first down has been made. In checking, the men at the ends of the chain and the head linesman measure (with the chain) the distance from one of the yard stripes to the point which represents the required ten yards. The head linesman then grasps the chain over one of the yard stripes, then the three men run onto the playing field to the spot where the ball rests. The head linesman places the chain in his clasped hand on the proper stripe to determine if the ball has been advanced the required distance. If this procedure and measuring shows that a first down has not been made, all three men return to the side lines and find the original position of the forward point of the chains.

This method of measuring is not accurate and is provocative of argument because the starting point is determined by estimating or sighting by the official. This is due to the fact that the ball is always on the field of play, usually at a considerable distance from the side lines; whereas the chain measuring device is operated along these side lines; consequently, the alignment of the end of the chain on the side line with the spot on the field at which the ball comes to rest, or is "dead," is merely an estimate or sighting operation by an official. The chain is also cumbersome and difficult to manipulate. Players sometimes become entangled therein, or are tripped thereby; and I have, therefore, perfected an improved measuring device which eliminates this chain and its stakes, and by means of which the yardage for first down can be readily and accurately measured.

Referring now to the drawing, the device comprises a flat beam or strip of material 10, provided with a depending cleat 11 on the one end thereof, this cleat being preferably formed of thin flat metal with a rounded lower end so that it readily pierces the earth. A link 12 is pivotally secured to the upper face of the cleat 11 and a chain 13, of predetermined length, is secured to said link, a stake 14 being secured to the opposite end of the chain and for a purpose to be presently described.

A clamping means C is adjustably mounted on the beam 10 as shown, and comprises a preferably metallic slide 15 having a downwardly depending cleat 16 (similar to cleat 11) formed integral therewith. Spaced apart upwardly projecting flanges 17 are also provided on said slide and an eccentric or cam 18 is mounted thereon, said cam being provided with laterally projecting, off-center, tubular trunnions 19 which are revolvably mounted in openings 20 provided in the flanges 17, and an elongated handle 21 is mounted in and projects from the face of the cam as shown.

A flat spring member 22 is pivotally mounted on and between the flanges 17 at the point 23, and extends longitudinally along the face of the beam beneath the cam, so that as the cam is rotated by swinging the handle downwardly, the face of said cam will engage said spring, pressing it down and into firm contact with the beam 10 to securely hold the clamping means in adjusted position.

In practice the device is operated by the head linesman who is assisted by a home team representative. The assistant carries the measuring device and stands on a predetermined yard stripe; for example, if the ball is "dead" at a point a short distance ahead of the ten-yard line, the assistant linesman will stand on the twenty-yard line, because in order to make a first down (ten yards), the ball would have to be advanced in four plays to a point a short distance ahead of the twenty-yard line.

Assuming that the ball is kicked, punted, or advanced to a point five feet ahead of the ten-yard line, the head linesman places the stake 14 in the center of the ten-yard line or stripe. He then swings the handle 21 upwardly, rotating the cam and relieving the pressure on the spring 22, so that the clamp C can be slidably adjusted to bring the cleat 16 in direct alignment with the front end of the ball, and the handle 21 is then swung down to securely hold the clamp in adjusted position.

The head linesman now hands the device to his assistant who stands on the twenty-yard stripe and play is resumed; and should there be at any time any question as to whether or not the necessary yardage has been gained, the assistant quickly hands the device to the head linesman who places the stake 14 in the center of the twenty-yard stripe, and the point where the cleat 16 is located, indicates the point to which the ball must be advanced to make first down. The measurement is in line with the ball so that accuracy is assured. There is no estimating, sighting, or guess-work necessary. Where the distance to be measured is very short, the beam only is used, the measurement being from the cleat 11 to the cleat 16.

All measurements are taken from the yard stripes or lines. The assistant remains a safe distance from play and must be ready to hand the device to the head linesman, so that he can check for first down, and the assistant can observe as the play is stopping whether or not he should move in to hand the device to the head linesman.

To avoid possible chance of error in checking for first down, means is provided on the clamp for keeping a record as to whether or not the chain was used in measuring the distance, or whether it was with the beam only; also, if the direction from the line in question is from the goal line or toward the fifty-yard line; and this is accomplished by providing a small crank 24 which is rotatably mounted on one of the flanges 17 at the point 25. Depressions 26 are provided on the side wall of the clamp as shown and an extension 27 is provided on the crank handle for registering and seating in the depressions as the crank is actuated, each depression having certain indicia or marks adjacent thereto to represent the direction, whether the measurement was with beam alone or with chain and beam, the crank being so mounted that its free end frictionally engages the side wall of the flange.

The beam is usually about eight feet long and the chain can be four feet in length, and whenever the distance to be measured is greater than the length of the beam, the chain is also utilized; and as the playing field is divided by five-yard stripes, it will be seen that the device fits every requirement.

From the foregoing, it will be obvious that I have perfected a very simple, practical, and convenient measuring device for use with the game of football, which insures accuracy of measurement, which relieves the officials, makes for safety of players, which speeds up the game, and is light in weight and easy to handle.

What I claim is:

1. A measuring stick for use in connection with a game of football, comprising a smooth beam of predetermined length and having a depending, earth piercing cleat on one end thereof, a chain anchored to the cleat end of the beam and having a ground piercing stake attached to the free end of the chain, a clamp mounted to slide on said beam to measure and designate the spot where the football comes to rest, a flat spring having its one end pivotally secured to the clamp with its free end engageable with the face of the beam, and a manually actuated cam mounted in the clamp and engageable with the spring for forcing it into frictional engagement with said beam to secure said clamp in set position on said beam.

2. A measuring device for use in football games comprising an elongated smooth beam member having a cleat on one end thereof, a flexible chain secured to the cleat end of the beam and provided with a ground piercing stake on the free end thereof, a clamp longitudinally adjustable on said beam for marking the play by play advance of the football during a game, said clamp having a cleat formed integral therewith, spaced apart upwardly extending flanges on the clamp, a flat spring having its one end pivotally secured to the flanges with its free end riding on the face of the beam, a cam rotatably mounted on said flanges and a handle on the cam for rotating said cam and forcing it into engagement with the spring to firmly secure the clamp in its adjusted position.

3. A measuring device for measuring the play by play advance of the football during a football game comprising an elongated smooth beam having a cleat on the one end thereof, a clamp longitudinally adjustable on the beam, a chain, approximately four feet in length, secured to the cleat end of the beam and having a ground piercing stake attached to the free end thereof, a ground piercing cleat formed integral with the clamp, a flat spring having one end pivotally secured to said clamp, rotatable means engageable with the free end of the spring for securing said clamp in adjusted position, to indicate and mark the advance of the football as the game is played.

4. A measuring device for use in a football game for indicating and measuring the advance of the ball as the game is played comprising, a flat beam having an earth piercing cleat on one end thereof, a flexible chain of predetermined length secured to the cleated end of the beam with an earth piercing stake on the free end of said chain, a longitudinally adjustable clamp slidable on said beam and provided with an earth piercing cleat, said clamp being movable on said beam to mark the advance of the football as the game is being played, and means associated with said clamp and frictionally engageable with said beam for securing the clamp in set position on said beam.

HAROLD J. BALMER.